(12) United States Patent
Barua

(10) Patent No.: US 11,759,860 B2
(45) Date of Patent: Sep. 19, 2023

(54) SYSTEMS AND METHODS FOR COMPENSATING A GEOMETRY OF A GREEN BODY PART BASED ON SINTERING-INDUCED DISTORTION

(71) Applicant: GENERAL ELECTRIC COMPANY

(72) Inventor: Ananda Barua, Glenville, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/092,520

(22) Filed: Nov. 9, 2020

(65) Prior Publication Data

US 2022/0143694 A1 May 12, 2022

(51) Int. Cl.
| | | |
|---|---|---|
| B29C 64/386 | (2017.01) | |
| G05B 19/4099 | (2006.01) | |
| B22F 10/00 | (2021.01) | |
| B33Y 10/00 | (2015.01) | |
| B33Y 40/20 | (2020.01) | |

(Continued)

(52) U.S. Cl.
CPC ............ *B22F 10/00* (2021.01); *B29C 64/188* (2017.08); *B29C 64/386* (2017.08); *B33Y 10/00* (2014.12); *B33Y 40/20* (2020.01); *G05B 19/4099* (2013.01); *B22F 10/10* (2021.01)

(58) Field of Classification Search
CPC ..... B29C 64/188; B29C 64/386; B33Y 10/00; B33Y 40/20; B33Y 50/00; G05B 19/4099; G06F 30/20; B22F 10/00; B22F 10/10; G06T 17/20; G06T 19/20;

(Continued)

(56) References Cited

U.S. PATENT DOCUMENTS

| | | |
|---|---|---|
| 9,636,872 B2 | 5/2017 | Batchelder |
| 9,925,725 B2 | 3/2018 | Batchelder |

(Continued)

FOREIGN PATENT DOCUMENTS

| | | |
|---|---|---|
| EP | 0010290 B1 | 4/1983 |
| WO | 2016201390 A1 | 12/2016 |

(Continued)

OTHER PUBLICATIONS

Extended European Search Report for EP Application No. 21204958.9 dated Apr. 11, 2022 (9 pages).

*Primary Examiner* — Yuhui R Pan
(74) *Attorney, Agent, or Firm* — Dinsmore & Shohl LLP

(57) ABSTRACT

A method of generating a distortion-compensated geometry for a workpiece includes generating a green body part geometry for the workpiece, discretizing the green body part geometry into a green body part mesh and performing a first sintering analysis on the green body part mesh to generate a post-sintering mesh based on the green body part mesh, the post-sintering mesh including a plurality of post-sintering mesh nodes. The method also includes co-registering the post-sintering mesh and a model mesh having a geometry corresponding to the three-dimensional model, the model mesh including a plurality of model mesh nodes. For each of the plurality of post-sintering mesh nodes, a displacement between a post-sintering mesh node and a corresponding model mesh nodes is determined, and the green body mesh may be adjusted based on the displacement to generate the distortion-compensated geometry.

20 Claims, 8 Drawing Sheets

(51) Int. Cl.
*B29C 64/188* (2017.01)
*B22F 10/10* (2021.01)

(58) Field of Classification Search
CPC . G06T 2207/10028; G06T 2207/30164; G06T 2219/2021; G06T 7/33
See application file for complete search history.

(56) References Cited

U.S. PATENT DOCUMENTS

| | | |
|---|---|---|
| 10,537,973 B2 | 1/2020 | Yamamura et al. |
| 10,610,931 B2 | 4/2020 | Morton et al. |
| 2018/0093419 A1* | 4/2018 | Lappas .................. G06T 19/20 |
| 2018/0307209 A1* | 10/2018 | Chin ........................ B22F 1/10 |

FOREIGN PATENT DOCUMENTS

| | | |
|---|---|---|
| WO | 2019209881 A1 | 10/2019 |
| WO | 2020006237 A1 | 1/2020 |
| WO | 2020070107 A1 | 4/2020 |

\* cited by examiner

SYSTEMS AND METHODS FOR COMPENSATING A GEOMETRY OF A GREEN BODY PART BASED ON SINTERING-INDUCED DISTORTION

BACKGROUND

Field

The present specification generally relates to additive manufacturing. More particularly, the present specification is directed to systems and methods for compensating a geometry of a workpiece for sintering-induced distortion.

Technical Background

Additive manufacturing, which may also be referred to as 3D printing, is a process in which material is built up layer-by-layer to form an object. Binder jetting is an additive manufacturing technique that uses a binder to join particles of a powder to form a three-dimensional object. In particular, the binder is jetted onto successive layers of the powder in a build volume, where layers of the powder and the binder adhere to one another to form a three-dimensional object. The powder may be, for example, polymers, metals, ceramics, or the like. The binder-printed part may be referred to as a "green body part," which may be subjected to subsequent processing to provide a densified final part. For example, the green body part may be inserted in a sintering furnace that heats the green body part to elevated temperatures (e.g., greater than or equal to about 500° C.) to remove the binder and solidify the powder particles to one another. Solidification of the green body part may result in distortion of the green part's shape.

For example, as the green body part shrinks from sintering-induced densification, different portions of the green body part may be subjected to varying degrees of forces such as gravity and friction that subject different portions of the green body part to different loads, leading to differing degrees of distortion in the green body part. As such, to produce final parts from the green body parts having shapes that conform to an input model, such distortion must be accounted for in the process of printing the green body part.

SUMMARY

According to an embodiment of the present disclosure, a method of generating a distortion-compensated geometry for a workpiece includes receiving a three-dimensional model for the workpiece, scaling the three-dimensional model by a green scaling factor to generate a green body part geometry, and discretizing the green body part geometry into a green body part mesh, the green body part mesh comprising a plurality of green body part mesh nodes. The method also includes performing a first sintering analysis on the green body part mesh to generate a post-sintering mesh based on the green body part mesh, the post-sintering mesh including a plurality of post-sintering mesh nodes. The method also includes co-registering the post-sintering mesh and a model mesh having a geometry corresponding to the three-dimensional model, the model mesh including a plurality of model mesh nodes, each of the plurality of model mesh nodes corresponding to one of the post-sintering mesh nodes, and, for each of the plurality of post-sintering mesh nodes, determining a displacement between a post-sintering mesh node and a corresponding model mesh node. The method also includes determining that at least one of the displacements is greater than or equal to a threshold, and, in response to the determination, moving a green body part mesh node in the green body part mesh in a direction opposite to a direction of the displacement of the post sintering mesh node that corresponds to the green body part mesh node to generate the distortion-predicting geometry. The method also includes outputting the distortion-compensated geometry to an additive manufacturing apparatus for printing the workpiece.

According to another embodiment, a method of generating a distortion-compensated geometry for a workpiece includes generating a green body part mesh for the workpiece, the green body part mesh comprising a plurality of green body part mesh nodes. The method also includes performing a first sintering analysis on the green body part mesh to generate a post-sintering mesh based on the green body part mesh, the post-sintering mesh including a plurality of post-sintering mesh nodes, the first sintering analysis comprising a plurality of loading conditions, the loading conditions comprising at least one of a gravitational load and a frictional load. The method also includes co-registering the post-sintering mesh and a model mesh having a geometry corresponding to a desired geometry for the workpiece, the model mesh including a plurality of model mesh nodes, each of the plurality of model mesh nodes corresponding to one of the post-sintering mesh nodes. The method includes computing a plurality of displacements of the plurality of post-sintering mesh nodes relative to the plurality of model mesh nodes, each of the displacements representing a distance between a post-sintering mesh node and a corresponding one of the model mesh nodes. The method also includes determining that the plurality of displacements does not meet a predetermined tolerance for the workpiece, and, in response to the determination, moving a green body part mesh node in the green body part mesh in a direction opposite to a direction of the displacement of the post sintering mesh node that corresponds to the green body part mesh node to generate the distortion-compensated geometry. The method also includes outputting the distortion-compensated geometry to an additive manufacturing apparatus for printing the workpiece.

According to another embodiment, a system for predicting a post-sintering geometry of a green body part after sintering include one or more processors and one or more non-transitory memory modules communicatively coupled to the one or more processors and storing machine-readable instructions. When executed, the instructions cause the one or more processors to: receive a three-dimensional model for a workpiece, scale the three-dimensional model by a green scaling factor to generate a green body part geometry, discretize the green body part geometry into a green body part mesh, the green body part mesh comprising a plurality of green body part mesh nodes. And perform a first sintering analysis on the green body part mesh to generate a post-sintering mesh based on the green body part mesh, the post-sintering mesh including a plurality of post-sintering mesh nodes. The instructions also cause the processor to co-register the post-sintering mesh and a model mesh having a geometry corresponding to the three-dimensional model, the model mesh including a plurality of model mesh nodes, each of the plurality of model mesh nodes corresponding to one of the post-sintering mesh nodes. For each of the plurality of post-sintering mesh nodes, the instructions cause the processor to determine a displacement between the post-sintering mesh node and a corresponding model mesh node, determine that at least one of the displacements is greater than or equal to a threshold, and in response to the determination, move a green body part mesh node in the green body part mesh in a direction opposite to a direction of the displacement of the post sintering mesh node that corresponds to the green body part mesh node to generate a distortion-compensated green body part geometry. The instructions also cause the processor to output the distortion-compensated geometry to an additive manufacturing apparatus for printing the workpiece.

Additional features, advantages, and embodiments of the processes and systems described herein will be set forth in the detailed description which follows, and in part will be readily apparent to those skilled in the art from that such features, advantages, and embodiments are contemplated and considered within the scope of the disclosure, based on the teachings disclosed hereupon.

It is to be understood that both the foregoing general description and the following detailed description describe various embodiments and are intended to provide an overview or framework for understanding the nature and character of the subject matter claimed and described herein. The accompanying drawings are provided to facilitate a further understanding of the various embodiments, and are incorporated into and constitute a part of this specification. The drawings illustrate the various embodiments described herein, and together with the description serve to explain the principles and operations of the subject matter claimed and described herein.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
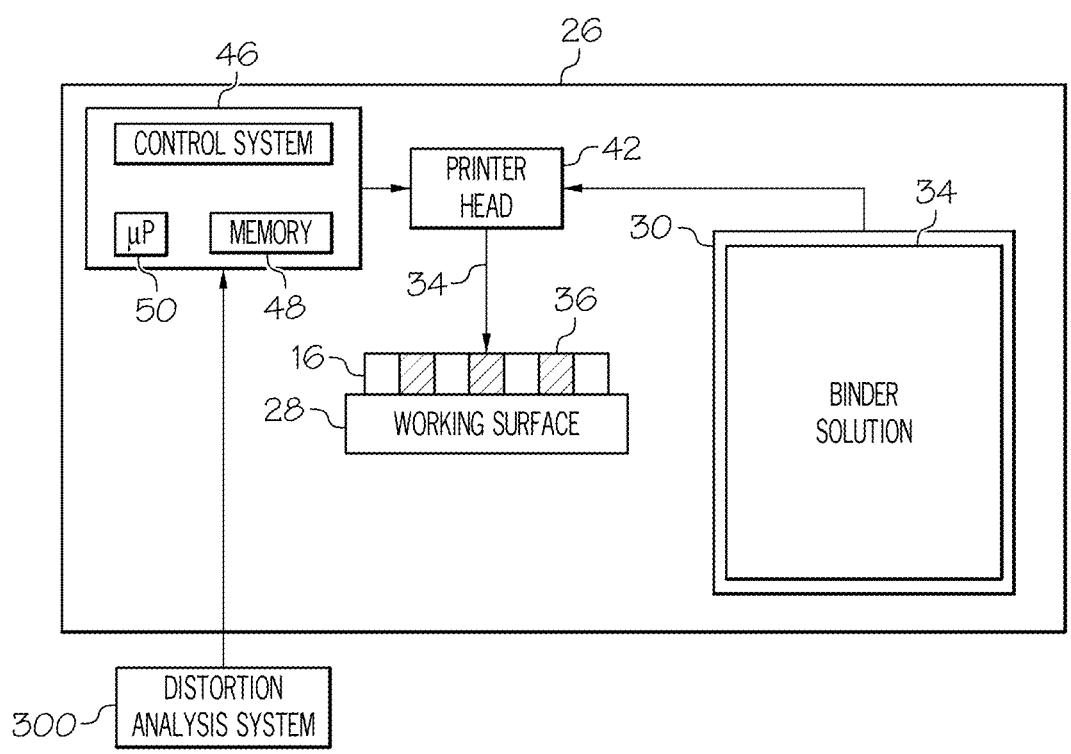
FIG. 1 schematically depicts an additive manufacturing apparatus including a distortion analysis system, according to one or more embodiments described herein.

Reference will now be made to various embodiments of generating a distortion-compensated geometry for a green body part for printing via an additive manufacturing apparatus, such as a binder jet additive manufacturing apparatus. The systems and methods described herein beneficially include predicting a distortion of the green body part using a sintering analysis that incorporates an accurate set of loading conditions (e.g., including shrinkage loads, gravitational loads, and frictional loads) that various regions of the green body part may be subjected to during sintering. For example, in embodiments, the systems and methods herein employ a finite element analysis incorporating friction and gravitational loads to predict nodal displacement vectors of a plurality of nodes of a green body part mesh when subjected to a sintering load associated with a sintering profile. The finite element analysis may output a post-sintering mesh of the green body part that is compared to a model mesh (e.g., un-distorted mesh) of the workpiece having a desired geometry. The systems and methods described herein employ a co-registration technique for comparing positions of corresponding nodes of the post-sintering mesh and the model mesh to determine a predicted displacement of the nodes relative to a desired position caused by the sintering. The predicted displacement is then used to update the green body part mesh until the predicted post-sintering geometry of the green body part mesh meets a building tolerance. As such, the systems and methods described herein employ accurate distortion prediction techniques for comparing simulated geometries to a desired geometry of the workpiece such that a distortion-compensated geometry tailored to result in a desired geometry for the workpiece is produced.

The systems and methods described herein facilitate the production of parts having more complex geometries than possible when using conventional distortion prediction techniques. Such capabilities may expand the utilization of binder jet additive manufacturing apparatuses to produce parts beyond the size capacities of other additive modalities, such as direct metal laser melting. Additionally, by incorporating techniques that accurately reflect the conditions that a green body part is subjected to during sintering and compensating green body part geometry in a manner that accurately reflects sintering-induced deviations from a desired part geometry, the systems and methods described herein reduce the need for part re-design and prototypes, thereby lowering development costs and processing times.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" (or "substantially" or "approximately") is used in describing a value or an endpoint of a range, the specific value or end-point referred to is comprised. Whether or not a numerical value or end-point of a range in the specification recites "about," two embodiments are described: one modified by "about," and one not modified by "about." It will be further understood that the endpoints of each of the ranges are significant both in relation to the other endpoint, and independently of the other endpoint. For example, the approximating language may refer to being within a 1, 2, 4, 10, 15, or 20 percent margin in either individual values, range(s) of values and/or endpoints defining range(s) of values.

Directional terms as used herein—for example up, down, right, left, front, back, top, bottom—are made only with reference to the figures as drawn and are not intended to imply absolute orientation.

As used herein, the singular forms "a," "an" and "the" comprise plural referents unless the context clearly dictates otherwise. Thus, for example, reference to "a" component comprises aspects having two or more such components, unless the context clearly indicates otherwise.

The phrase "green body part," as used herein, refers to a printed workpiece that has not undergone heat treatment to remove a binder. Green body parts may include particulate material that has not been consolidated through heating to a compaction temperature of the particulate material. Green body parts consolidate during sintering when heated to a sufficient temperature to form post-sintering parts. As such, green body parts may have greater porosities (e.g., greater than or equal to 20%) than post-sintering parts.

The term "sintering," as used herein, refers to heating a green body part to one or more elevated temperatures. Sintering of the green body part may occur in multiple stages. For example, in embodiments, sintering may include heating the green body part to at least a first elevated temperature to induce thermal decomposition of at least a portion of a binder used to print the green body part. The green body part may then be heated above a second elevated temperature that is greater than the first elevated temperature to consolidate powder particles to form a post-sintering, consolidated part.

Referring now to FIG. 1, an additive manufacturing apparatus 26 that additively manufactures a green body part by binder jetting is schematically depicted. The additive manufacturing apparatus 26 includes a control system 46, a printer head 42, a binder reservoir 30, a binder solution 34, a working surface 28, and a distortion analysis system 300. In embodiments, the additive manufacturing apparatus 26 includes a powder supply (not depicted) and a recoater (not depicted) that coats a layer of powder material 16 onto the working surface 28. For example, the control system 46 may control the recoater and powder supply to provide the layer of powder material 16 onto the working surface 28. In embodiments, the layer of powder material 16 may have a thickness greater than or equal to 10 microns (μm) and less than or equal to 200 μm. The particulate material used to print the green body part may vary depending on the type of part and the end use of the part.

In embodiments, the layer of powder material 16 is made of a particulate material. The particulate material may include a metal particulate material, such as a nickel alloy (e.g., Inconel 625, Inconel 718, Rene'108, Rene'80, Rene'142, Rene'195, and Rene'M2, Marm-247), a cobalt alloy (e.g., Hans 188, L605, X40, X45, and FSX414), a cobalt-chromium alloy, a titanium alloy, an aluminum-based alloy, a tungsten alloy, a stainless steel alloy, or a combination thereof. In embodiments, the metal particulate material may comprise particles having a particle size distribution greater than or equal to 1 microns (μm) and less than or equal to 75 μm. Such particulate materials may be used to print metal articles including, by way of example and not limitation, fuel tips, fuel nozzles, shrouds, micro mixers, or turbine blades. In embodiments, the particulate material may include a ceramic particulate material, such as alumina, aluminum nitride, zirconia, titania, silica, silicon nitride, silicon carbide, boron nitride, or a combination thereof. In embodiments, the ceramic particulate material may comprise particles having a particle size distribution greater than or equal to 0.1 μm to less than and equal to 100 μm. Such particulate materials may be used to print ceramic articles for use in, by way of example and not limitation, the medical and transportation industries. It should be understood that the system and methods described herein may be used with a plurality of different particulate materials, depending on the implementation.

Referring still to FIG. 1, after depositing the layer of powder material 16 on the working surface 28, the control system 46 may control the printer head 42 to selectively deposit the binder solution 34 onto and into the layer of powder material 16 in a pattern that is representative of a layer of the green body part being printed. The control system 46 may include a distributed control system (DCS) or any computer-based workstation that is fully or partially automated. In embodiments, the control system 46 may be any suitable device employing a general purpose computer or an application-specific device, which may generally include memory circuitry 48 storing one or more instructions for controlling operation of the additive manufacturing apparatus 26. The memory circuitry 48 may store CAD models representative of a structure of the green body part being printed and/or the post-sintering part. The control system 46 may include one or more processing devices (e.g., microprocessor 50), and the memory circuitry 48 may include one or more tangible, non-transitory, machine-readable media collectively storing instructions executable by the microprocessor 50 to control actions described herein. The distortion analysis system 300 is coupled to the control system 46. In embodiments, the distortion analysis system 300 is incorporated into the control system 46. In embodiments, the distortion prediction system 300 is separate from the additive manufacturing apparatus 26 and communicates with the additive manufacturing apparatus 26 over a network. The distortion analysis system 300 performs the various operations described herein to compensate geometries for green body parts to be printed via the additive manufacturing apparatus 26 in view of predicted sintering-induced distortion. The distortion analysis system 300 is described in greater detail herein with respect to FIG. 3.

In embodiments, a plurality of layers of powder material 16 are successively applied to the working surface 28, and the control system 46 selectively applies the binder solution 34 in a pattern on each of the layers of powder material 16. After such a process is performed to form an entirety of an intended structure of the green body part, the plurality of layers of powder material 16 may be heated to a curing temperature (e.g., greater than or equal to 25° C. and less than or equal to 100° C.) to evaporate at least a portion of a solvent in the binder solution 34. Heat may be applied to the printed part using an IR lamp and/or heated plate (e.g., on-machine), or may be carried out by placing the printed part in an oven (e.g., off-machine). Upon curing, the binder bonds the particulate material according to the pattern of the binder solution 34 printed into each layer of powder material 16 to form the green body part. Suitable binders include, but are not limited to, thermoplastic binders, thermoset binders, and non-polymeric binders such as waxes and sugars (e.g., glucose, fructose, derivatives thereof, or a combination thereof).

Figure 2A:
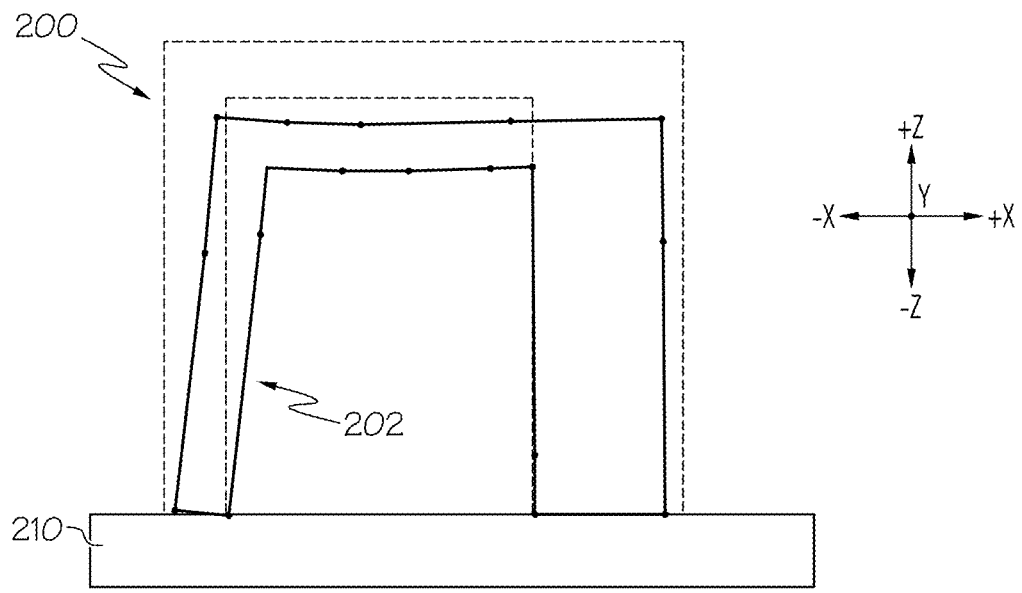
FIG. 2A schematically depicts a green body part and a post-sintering part, according to one or more embodiments described herein.

FIG. 2A schematically depicts an illustrative green body part 200. The green body part 200 may include 50% to 70% by volume of the particulate material used to form the layers of powder material 16 described herein with respect to FIG. 1. Another 1% to 2% of the volume of the green body part 200 may include cured binder (e.g., cured from the binder solution 34 described with respect to FIG. 1). A remainder of the volume of the green body part 200 may include porosity. As such, after production by the additive manufacturing apparatus 26, the green body part 200 may generally be approximately 50% dense to 70% dense. It should be understood that such densities may be after performance of post-printing processes (e.g., transferring, inspection, depowdering, and the like) of the green body part 200.

To further densify the green body part 200, the green body part 200 is transferred to a sintering furnace (not depicted) that heats the green body part 200 to at least a first elevated temperature. In embodiments, sintering of the green body part 200 may occur in multiple stages. For example, in embodiments, sintering may include heating the green body part 200 to at least a first elevated temperature to induce thermal decomposition of at least a portion of a binder used to print the green body part 200 (e.g., to "debind" the green body part 200). The green body part 200 may then be heated above a second elevated temperature that is greater than the first elevated temperature to consolidate powder particles to form a post-sintering part 202. The second elevated temperature may be referred to as a sintering compaction temperature at which to the particulate material used to form the layers of powder material 16 described with respect to FIG. 1 begins to melt in order to solidify the green body part 200 and compact the green body part 200 into a post-sintering part 202. In embodiments, the second elevated temperature is greater than or equal to 300° C. (e.g., greater than or equal to 500° C., greater than or equal to 700° C., greater than or equal to 1000° C.). In embodiments, the post-sintering part 202 possess a density that is greater than or equal to 92% (e.g., greater than or equal to 92% and less than or equal to 98%). That is, the post-sintering part 104 may have a porosity that is less than or equal to 5% by volume.

FIG. 2A depicts the post-sintering part 202 after the green body part 200 undergoes sintering. The post-sintering part 202 has a considerably smaller volume than the green body part 200. Densification of the particulate material used to form the green body part 200 compacts the particulate material leading to volumetric shrinkage of the green body part 200 during sintering. In addition to having a smaller volume the green body part 200, the post-sintering part 202 is also deformed relative to the green body part 200 such that the post-sintering part 202 comprises a different shape than the green body part 200. That is, the shrinkage of the green body part 200 during sintering is not uniform. For example, regions of the green body part 200 may shrink at different rates during sintering, resulting in different stress loads (e.g., tensile, compressive, strain) at different regions of the green body part 200. Such loads may result in distortion of the green body part 200 such that the post-sintering part 202 deviates in shape from the green body part 200. Additional loads (e.g., friction, gravitational loads, and the like) may also induce stress loads at different regions of the green body part 102 during sintering.

Figure 2B:
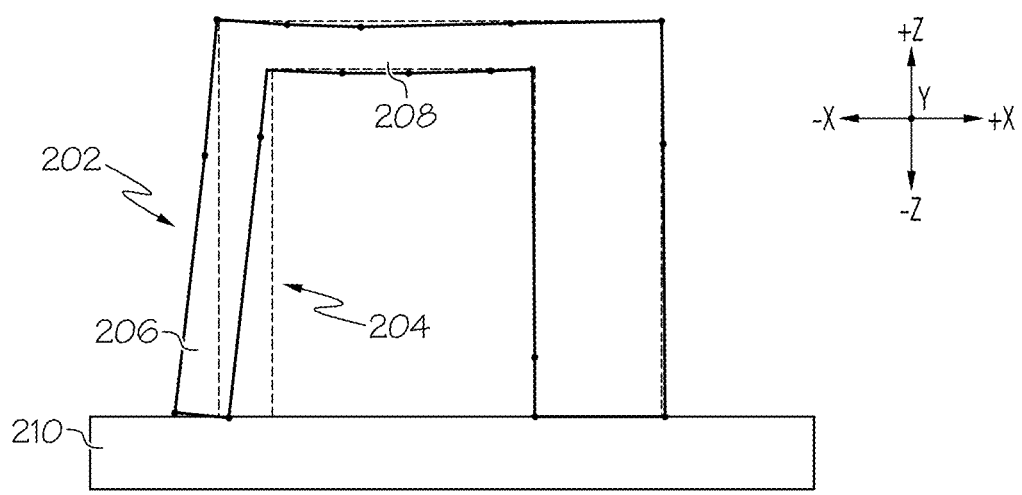
FIG. 2B schematically depicts a post-sintering part overlaid with a nominal un-distorted part model, according to one or more embodiments described herein.

FIG. 2B depicts the post-sintering part 202 overlaid onto an undistorted workpiece model 204. For example, the undistorted workpiece model 204 may be based on a CAD model imported into the additive manufacturing apparatus 26 that represents a desired geometry for a workpiece post-sintering. The distortion of the green body part 200 during sintering causes the post-sintering part 202 to significantly deviate from the undistorted workpiece model 204. For example, a first portion 206 of the post-sintering part 202 deviates from the undistorted workpiece model 204 in in a direction parallel to a sintering support 210 (e.g., the negative X-direction) on which the green body part 200 was placed during sintering. Such a displacement may be a result of friction between the green body part 200 and the sintering support 210 during shrinkage. Additionally, a second portion 208 of the post-sintering part 202 extends (e.g., curves) below the undistorted workpiece model 204 (e.g., in the negative Z-direction) due to gravitational loads on the second portion 208 during sintering.

To produce post-sintering parts having geometries that correspond with those initially input to the additive manufacturing apparatus 26, the geometry of the green body parts produced by the additive manufacturing apparatus 26 should be compensated based on predictions of sintering-induced distortion of the green body parts. In view of the foregoing, the distortion analysis system 300 performs various actions described herein to compensate a geometries of green body parts based on sintering-induced distortion thereof such that post-sintering parts possess geometries.

Figure 3:
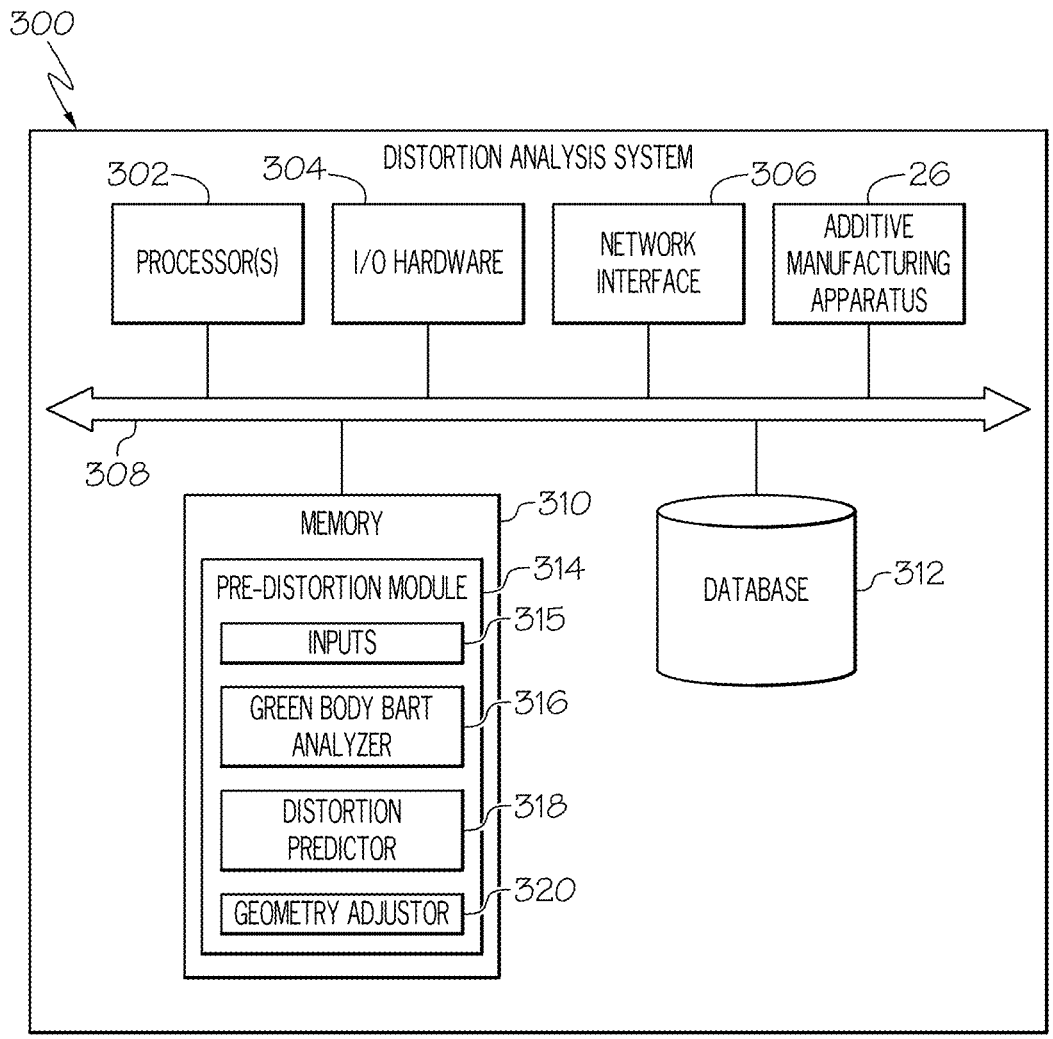
FIG. 3 schematically depicts the distortion analysis system depicted in FIG. 1, according to one or more embodiments described herein.

FIG. 3 schematically depicts the distortion analysis system 300. The distortion analysis system 300 is configured to predict distortion of green body parts during sintering and generate distortion-compensated geometries for the green body parts based on the distortion predictions using the methods described herein. As shown, the distortion analysis system 300 includes a processor 302, input/output ("I/O") hardware 304, a network interface 306, a communications bus 308, a memory 310, and a database 312. In the shown example, the distortion analysis system 300 also includes the additive manufacturing apparatus 26 described with respect to FIG. 1. For example, in embodiments, the distortion analysis system 300 may be incorporated into the control system 46 described herein for predicting a distortion of a green body part and compensating the green body part based on a desired shape imported to the control system 46. In embodiments, the distortion analysis system 300 may receive a CAD model representing a desired shape of a post-sintering part and predict distortion of a green body part derived from the CAD model. In embodiments, the distortion analysis system 300 does not include the additive manufacturing apparatus 26 and operates as a separate system. In embodiments, the distortion analysis system 300 may communicate a distortion-compensated geometry to the additive manufacturing apparatus 26 via the network interface 306.

While the distortion analysis system 300 is shown to include a single processor 302, it should be appreciated that the distortion analysis system 300 may include any number of processors depending on the implementation. The processor 302 can include any suitable processing device, such as a microprocessor, microcontroller, integrated circuit, logic device, and/or other suitable processing device. In embodiments, the processor 302 is a processing circuit (e.g., either a single processing circuit or a group processing circuit) that executes some or all of the machine-readable instructions from multiple modules of one or more non-transitory computer-readable mediums (e.g., the memory 310).

I/O hardware 304 may include at least one element to receive inputs from a user and/or provide results of the computations performed via the distortion analysis system 300 to a user. For example, in embodiments, the I/O hardware 304 may include a basic input/output system (BIOS) that interacts with hardware of the distortion analysis system 300, device drivers that interact with particular devices of the distortion analysis system 300, one or more operating systems, user applications, background services, background applications, and the like. The network interface 306 can include any suitable components for interfacing with one or more network(s), including for example, transmitters, receivers, ports, controllers, antennas, and/or other suitable components. The network interface 306 may include and/or be configured to communicate with any wired or wireless networking hardware, including an antenna, a modem, a LAN port, a wireless fidelity (Wi-Fi) card, a WiMax® card, a long term evolution (LTE®) card, a ZigBee® card, a Bluetooth® chip, a USB™ card, mobile communications hardware, and/or other hardware for communicating with other networks and/or devices. The network interface 306 allows the distortion analysis system 300 to communicate with external computing systems over a network. The database 312 may generally comprise a data storage component communicably coupled to the processor 302 via the communication bus 308. As a non-limiting example, the database 312 may include one or more database servers that support NoSQL, MySQL®, Oracle®, SQL Server®, NewSQL, and/or the like.

The memory 310 is communicatively coupled to the processor 502. As a non-limiting example, the memory 310 may comprise one or more non-transitory computer-readable medium that may be one of a shared memory circuit, dedicated memory circuit, or group memory circuit. Non-limiting examples of the memory include random access memory (including SRAM, DRAM, and/or other types of random access memory), read-only memory (ROM), flash memory, registers, compact discs (CD), digital versatile discs (DVD), and/or other types of storage components. Memory 310 may store instructions accessible to the processor 302 via an addressing scheme such that the processor 302 may access the memory 310 to execute the instructions in accordance with a program to perform any of the functions and operations described herein.

The memory 310 is shown to include pre-distortion module 314. The pre-distortion module 314 may cause the processor 302 to form a series of computational operations to formulate a green body part geometry from a part model input to the distortion analysis system 300, predict a distortion of the green body part geometry during sintering to generate a post-sintering geometry of the green body part geometry, quantify deviations between the post-sintering geometry and the part model, and generate a distortion-compensated geometry for the green body part based on the quantified deviations. Although the pre-distortion module 314 is depicted as a single module, it should be appreciated that any of the operations described herein may be performed using any number of modules depending on the implementation.

To facilitate performance of the operations described herein, the distortion analysis system 300 may receive a plurality of inputs 315 from a user and/or a separate system (e.g., the additive manufacturing apparatus. The inputs 315 may include a desired geometry for a workpiece to be produced by an additive manufacturing apparatus (e.g., a desired post-sintering geometry for the workpiece). In embodiments, the desired geometry may take the form of a CAD model or three-dimensional representation of a part to be printed and post-processed (e.g., sintered) by an additive manufacturing apparatus. The inputs 315 may also define a material configuration for the workpiece. For example, the inputs 315 may define the particulate material to be used in construction of the green body part, the powder size distribution for the green body part, the binder solution, and the like. Additionally, the inputs 315 may also define a sintering profile for the green body part, defining the sintering temperatures and sintering time for the green body part.

The inputs 315 received by the distortion analysis system 300 to perform the operations described herein may also include material properties of the material configuration for the workpiece to be used in the sintering analysis of the green body part. The material properties may be pre-stored as a calibration model within the pre-distortion module 314, which may identify material property values for material properties (e.g., elastic modulus—such as a Young's modulus, a shear modulus, and a bulk modulus—Poisson's ratio, density, tensile strength, yield strength, hardening modulus) of that material configuration previously measured during sintering of previous parts having the material configuration. Inputs 315 may also include conditions used in the sintering analysis defining loading conditions and boundary conditions that the green body part is subjected to during sintering. Loading condition inputs may define external forces that the green body part is subjected to during sintering (e.g., friction, gravity, etc.). Boundary conditions may include displacement constraints on the green body part during sintering, determined, for example, by the support for the green body part during sintering (e.g., the position of the sintering support 210 depicted in FIG. 2B).

Inputs 315 to the distortion analysis system 300 may also include green scaling factors, which may define inverted amounts that the material configuration may shrink during sintering in a plurality of different directions. For example, in embodiments, three green factors are input to the distortion analysis system 300, with each green scale factor defining an inverse of a shrinkage of the material configuration in an X-direction, a Y-direction, and a Z-direction, respectively. In embodiments, the user may also input a build tolerance for the workpiece. The build tolerance may define a maximum acceptable amount that a post-sintering workpiece may deviate from an input post-sintering geometry. In embodiments, the build tolerance is a maximum nodal displacement that represents a maximum amount that a post-sintering node may deviate from a model mesh node having a desired geometry. In embodiments, the build tolerance is a plurality of maximum nodal displacements that may vary based on location within the workpiece. In embodiments, the build tolerance is maximum total nodal displacement that may represent a maximum acceptable of total nodal displacements between the post-sintering mesh nodes and the model mesh nodes.

In embodiments, the inputs 315 to distortion analysis system 300 may also include a compensation factor (or a set of compensation factors) for adjusting a geometry of the green body part based on the predicted distortion of the green body part. In embodiments, the compensation factor is a multiplier that is applied to a predicted displacement between a post-sintering node and a corresponding model mesh node and used to displace a green body mesh node to update the green body mesh node for further iterations of the methods described herein. In embodiments, the inputs include a set of compensation factors for each node in the green body part mesh. Each compensation factor in the set of compensation factors may not be different values, but may differ based on location within the green body part mesh. The compensation factors may enhance the efficiency of generating the distortion-compensated geometries described herein by reducing the needed number of iterations. In embodiments, rather than being input the distortion analysis system 300, the compensation factors are pre-stored in the pre-distortion module 314. For example, the compensation factors may be empirically derived from previous measurements of distortion of previous green body parts during sintering. In embodiments, the compensation factors are scalar quantities. In embodiments, the compensation factor(s) may be variable quantities dependent on at least one other quantity (e.g., magnitude of predicted distortion, position within a workpiece, material properties of the workpiece, and the like).

Referring still to FIG. 3, the pre-distortion module 314 is shown to include a green body part analyzer 316, a distortion predictor 318, and a geometry adjuster 320. The green body part analyzer 316 causes the processor 302 to generate a green body part geometry from the desired geometry of the workpiece input to the distortion analysis system 300, form a green body part mesh from the green body part geometry, and generate a model mesh from the green body part mesh. For example, in embodiments, the green body part analyzer 316 may up-scale the desired geometry using the green scaling factors to generate the green body part geometry. The green body part analyzer 316 may then discretize the green body part geometry into a green body part mesh including a plurality of elements and green body part mesh nodes. The green body part mesh may then be duplicated and down-scaled by the green scaling factors to generate the model mesh including a plurality of elements and model mesh nodes.

The distortion predictor 318 is configured to estimate a deformation and stress load of the green body part during sintering. In embodiments, the distortion predictor 318 includes a finite element analysis framework for calculating distortion of the green body part geometry under specified loading and boundary conditions of a sintering process (e.g., the loading and boundary conditions may be inputs 315). In embodiments, the finite element analysis framework employs a steady state analysis (e.g., where material properties of the green body part are held constant) or a time-depending analysis (where material properties of the green body parts vary during sintering). In embodiments, the finite element analysis framework assumes that the green body part has linear material properties. In embodiments, the finite element analysis framework assumes that the green body part has non-linear material properties. Loading conditions used by the distortion predictor 318 in performing the finite element analysis may include all of the external forces that the green body part is subjected to during sintering (e.g., friction, gravity, etc.). Boundary conditions may include displacement constraints on the green body part during sintering, determined, for example, by the support for the green body part during sintering. Each element of the green body part mesh may be simulated as a solid governed by a specific set of material properties (e.g., received as one of the inputs 315) such that the distortion of each element may be predicted by the finite element analysis framework to predict a displacement for each node in the green body part mesh and generate a post-sintering mesh including a plurality of post-sintering mesh nodes.

The geometry adjuster 320 co-registers the post-sintering mesh nodes and the model mesh nodes and computes nodal displacement vectors representing directional displacements between each post-sintering mesh node and a corresponding one of the model mesh nodes. The geometry adjuster 320 also compares the magnitudes of each of the nodal displacement vectors to a threshold or building tolerance (e.g., one of the inputs 315) and, if the building tolerance is not met, applies a compensation factor to the nodal displacement vector of a post-sintering mesh node not meeting the building tolerance, and moves a corresponding green body part mesh node by the compensated nodal displacement vector to generated an updated green body part geometry. The green body part analyzer 316 may then generate an updated green body part mesh from the updated green body part geometry, and the distortion predictor 318 may generate an updated post-sintering mesh from the updated green body part mesh, which may then be compared to the model mesh via the geometry adjuster 320. Such a process may repeat until the building tolerance is met to generate a final distortion-compensated geometry for the workpiece.

Figure 4:
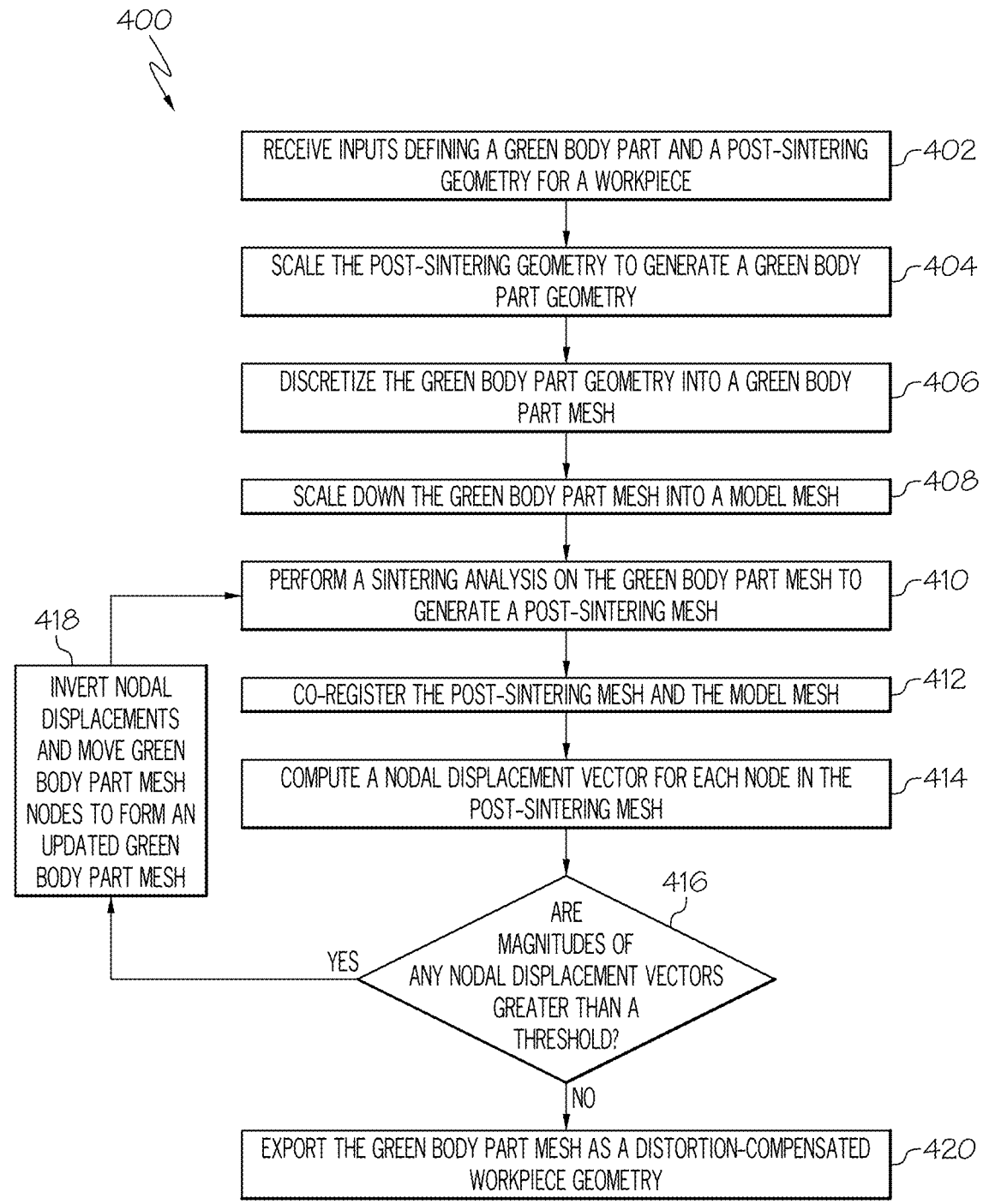
FIG. 4 depicts a flow diagram of a method of providing a distortion-compensated geometry for a workpiece, according to one or more embodiments described herein.

FIG. 4 depicts a flow diagram of an illustrative method 400 of generating a distortion-compensated geometry of a workpiece to be manufactured by an additive manufacturing apparatus (e.g., the additive manufacturing apparatus 26 described herein). The method 400 may be performed by the distortion analysis system 300 described herein. For example, the pre-distortion module 314 may cause the processor 302 to perform the various operations of the method 400 to generate the distortion-compensated geometry that may be used to control the printing process of the additive manufacturing apparatus 26 and generate a green body part having the distortion-compensated geometry such that, after sintering, the workpiece is of a desired geometry within a building tolerance.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, comprising: matters of logic with respect to arrangement of steps, operational flow, order of components, or orientation of components; plain meaning derived from grammatical organization or punctuation, and; the number or type of embodiments described in the specification.

At block 402, inputs defining a green body part and a post-sintering geometry for a workpiece are received. The received inputs may correspond to the inputs 315 described herein with respect to FIG. 3. For example, in embodiments, a user may upload a model of the workpiece defining the post-sintering geometry of the workpiece to the control system 46 of the additive manufacturing apparatus 26. In embodiments, a user may input parameters of the material configuration of the green body part (e.g., defining a particulate material and a binder solution to be used in printing), a sintering profile for sintering the green body part, material properties to be used in sintering analysis, building tolerances for the post-sintering geometries, compensation factors to be used in adjusting a green body part geometry, and green scaling factors for the material configuration. It should be understood that any of the inputs 315 described herein may not be input to the distortion analysis system 300 as part of performance of the method 400, but may rather be pre-stored in the distortion analysis system 300 or received from a separate computing system over a network. Any number of computing or control systems may be used in performance of the method 400 consistent with the present disclosure.

At block 404, the distortion analysis system 300 scales the post-sintering geometry to generate a green body part geometry. For example, in embodiments, the green body part analyzer 316 of the pre-distortion module 314 may cause the processor 302 to apply green scaling factors to the post-sintering geometry received at block 402 to generate the green body part geometry. That is, the volume of the post-sintering geometry may be expanded in a plurality of dimensions to generate the green body part geometry. At block 406, the distortion analysis system 300 discretizes the green body part geometry into a green body part mesh. For example, the green body part analyzer 316 may use any suitable meshing process to separate the green body part geometry into a plurality of elements delineated between a plurality of green body part mesh nodes. Each of the elements may constitute a discrete solid having a set of material properties that may deform when subjected to loading conditions. The green body part mesh nodes may represent corners and/or centers of each element, and the elements may have any number of shapes (e.g., tetrahedron, parallelepiped, triangular) depending on the implementation.

At block 408, the green body part mesh is scaled down into a model mesh. For example, in embodiments, the green body part analyzer 316 depicted in FIG. 3 may invert the green scaling factors used to form the green body part geometry at block 404 and apply the inverted green scale factors to the green body part mesh (e.g., to reduce the size of each element by the inverted scale factor in each direction associated with each green scaling factor) to generate the model mesh including a plurality of model mesh nodes. In embodiments, the model mesh represents a discretized version of the post-sintering geometry input to the distortion analysis system 300 at block 402. In embodiments, the method 400 may not include block 408 and the model mesh may be input to the distortion analysis system 300, or be computed by an alternative analysis (e.g., by a separate meshing process on the input post-sintering geometry).

At block 410, a sintering analysis is performed on the green body part mesh to generate a post-sintering mesh including a plurality of post-sintering mesh nodes. In embodiments, the distortion predictor 318 depicted in FIG. 3 may utilize a finite element analysis framework using sets of loading conditions and boundary conditions. The loading conditions may define the external forces that various portions of the green body part are subjected to during sintering. For example, in embodiments, the loading conditions include a friction force applied to portions of the green body part that are in contact with different structures (e.g., a sintering support) based on the material configuration of the green body part. The loading conditions may also include gravitational forces exerted on the green body part and parameters defining volumetric shrinkage of the particulate material of the green body part. For example, material properties such as Poisson's ratio and Young's modulus may be used to determine volumetric changes of elements of the green body part mesh and resulting forces applied to the various elements. Based on the deformation of each element, the elements of the post-sintering mesh may not be merely scaled down versions of the elements of the green body part mesh, but also have a different shape, meaning that the relative distance between each of the plurality of green body part mesh nodes may be altered as a function of element size.

At block 412, the distortion analysis system 300 co-registers the post-sintering mesh and the model mesh into a common coordinate space. As used herein, the term "co-register" means the positioning the nodes of a first mesh onto the nodes of a second mesh within a common coordinate system to facilitate comparison of the positioning of corresponding nodes in each of the meshes. In the present case, since the post-sintering mesh is a distorted version of the model mesh, it is difficult to co-register the notes to facilitate the comparison of corresponding nodes because different portions of the geometry of the model mesh may have been distorted by different amounts. That is, a simple shifting of the post-sintering nodes by a fixed amount will not work because such an approach fails to account for the differing amounts that each nodes are displaced as a result of sintering. Accordingly, the geometry adjuster 320 depicted in FIG. 3 may cause the processor 302 to undergo a multi-step co-registration process that displaces each node of the model mesh relative to each corresponding node of the post-sintering mesh in a directionally dependent manner. An example of such a co-registration process is described in greater detail herein with respect to FIG. 6.

At block 414, the distortion analysis system 300 computes a nodal displacement vector for each node in the post-sintering mesh. Once the post-sintering mesh and the model mesh are co-registered, positions of corresponding nodes of the post-sintering mesh and the model mesh are compared to one another to compute the nodal displacement vectors. As used herein, the term "corresponding node" refers to values having the same relative position within the data arrays defining the two nodes. As will be appreciated, both the post-sintering mesh and the model mesh in the present example have the same number of nodes, as both were derived from the green body mesh. Thus, the position information describing the positioning of each post-sintering mesh node and each model mesh node within the co-registration coordinate space will include the same structure of data values. Comparison of the position information of corresponding ones of the post-sintering mesh nodes and the model mesh nodes may include comparing position values at the same location within the data arrays containing the position information. As a result of the distortion of the post-sintering mesh, the comparison of corresponding nodes may not necessarily be equivalent to the comparison of the nearest nodes of each mesh to one another. At block 416, the distortion analysis system 300 compares magnitudes of the nodal displacement vectors computed at block 414 to a threshold. For example, as described with respect to FIG. 3, the inputs 315 to the distortion analysis system 300 may define a building tolerance for the post-sintering part defining a maximum displacement between the nodes of the post-sintering mesh and the model sintering mesh. In embodiments, the maximum displacement is a maximum total displacement, and the magnitudes of the nodal displacement vectors may be added to one another and compared to a threshold displacement. In embodiments, such maximum total displacements are based on regions within the workpiece geometry, and different groupings of nodal displacement vector magnitudes may be added and compared to regionally-dependent thresholds. In embodiments, the building tolerance may define a maximum nodal displacement threshold such that if any of the post-sintering mesh nodes is displaced from a corresponding one of the model mesh holds by more than the maximum nodal displacement, the building tolerance is not met. In embodiments, such a maximum nodal displacement may be the same throughout the workpiece geometry. In embodiments, the maximum nodal displacement is node-specific.

In embodiments, if the distortion analysis system 300 determines that at least one of the nodal displacement vector magnitudes is greater than or equal to a threshold (e.g., either as a sum with other displacements or individually), the method 400 moves to the block 418, where the distortion analysis system 300 inverts the nodal displacements computed at block 414 and moves the green body mesh nodes based on the inverted nodal displacements to form an updated green body part mesh. For example, to compensate for the distortion of the post-sintering mesh indicated by the nodal displacement vectors computed at block 414, the direction of the nodal displacement vectors may be inverted to move the green body part mesh nodes in a direction that opposes the distortion. In embodiments, only the green body part mesh nodes that correspond to the post-sintering mesh nodes not meeting the build tolerance are moved. In embodiments, for example, where the building tolerance relates to a maximum total nodal displacement, each of the nodes of the green body mesh may be moved in a direction that opposes the predicted distortion of a corresponding post-sintering mesh node from the model mesh.

In embodiments, the amount that each green body part mesh node is displaced is scaled by a compensation factor. That is, there may not be a one-to-one correspondence between the predicted displacement of a particular post-sintering mesh node relative to the model mesh and the amount that the corresponding green body part mesh node is moved in the updated green body part mesh. As described herein, one or more compensation factors may be input to the distortion analysis system 300 for performance of the method 400 that specify the amount of scaling for the movement of the green body part mesh nodes. In an example, if a particular post-sintering mesh node is predicted to be displaced from a corresponding mesh node by 5 mm in the positive x-direction, the corresponding green body part mesh node may be moved by an amount corresponding to c*5 mm in the negative x-direction, where c is the compensation factor for that particular green body part mesh node. The compensation factor c may be more or less than one, depending on the situation, and be based empirically on the distortion of the particular material configuration of the green body part.

After the green body part mesh nodes are moved to compensate for the predicted distortion, the method reverts back to block 410, where another sintering analysis is performed to generate an updated post-sintering mesh. The processes according to blocks 412, 414, and 416 are then repeated so that the displacements updated post-sintering mesh nodes from the model mesh nodes are again checked for conformance with the build tolerance. In embodiments, such a process may repeat until the building tolerance is met. In embodiments, there may be an iteration cap for the method 400, specifying a maximum number of updated green body mesh nodes that may be generated. In such embodiments, if the building tolerance is not met by the time the iteration cap is reached, the method 400 may advance to block 420.

At block 420, the distortion analysis system 300 exports the green body part mesh that resulted in the post-sintering mesh meeting the build tolerance (or the post-sintering mesh after the iteration cap is reached) as a distortion-compensated geometry for the workpiece. In embodiments, exporting the green body part mesh may include exporting the distortion-compensated geometry to the additive manufacturing apparatus 26 for printing and subsequent sintering. In embodiments, exporting the green body part mesh may include displaying the distortion-compensated geometry on a display of the distortion analysis system 300 or transmitted the distortion-compensated geometry over a network (e.g., to an operator of an additive manufacturing apparatus separate from the distortion analysis system 300).

Figure 5A:
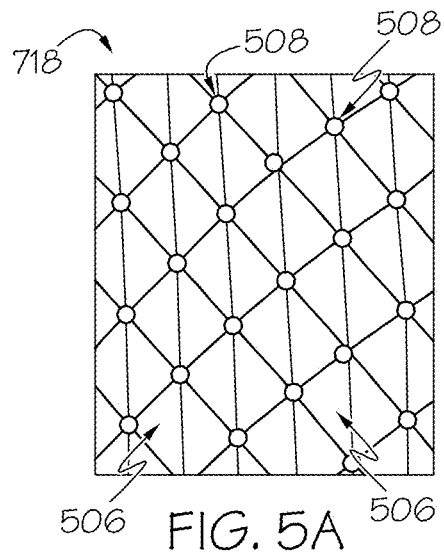
FIG. 5A schematically depicts a mesh used to discretize a green body part geometry in performing a distortion prediction analysis, according to one or more embodiments described herein.

Referring now to FIG. 5A, an example mesh 504 that may be used in the performance of the method 400 is schematically depicted. The mesh 504 includes a plurality of elements 506 that are discrete solids that are populated with the material configuration of the green body part to make up a full green body part model. Each of the elements 506 represents the smallest discrete region of the green body part model subjected to the sintering analysis described herein. Depending on the implementation, the elements 506 may be shaped differently. In embodiments, each of the elements 506 is represented by a tetrahedral element, through differently shaped elements (e.g., parallelepiped elements, etc.) are contemplated and within the scope of the present disclosure. The mesh 504 includes a plurality of nodes 508 representing corners and/or centers of boundary segments of each of the plurality of elements 506. FIG. 5A depicts only a portion of the mesh 504, and the pattern depicted in FIG. 5A may be overlaid any number of times onto a green body part model such that an entirety of the green body part model is discretized via the mesh 504.

Figure 5B:
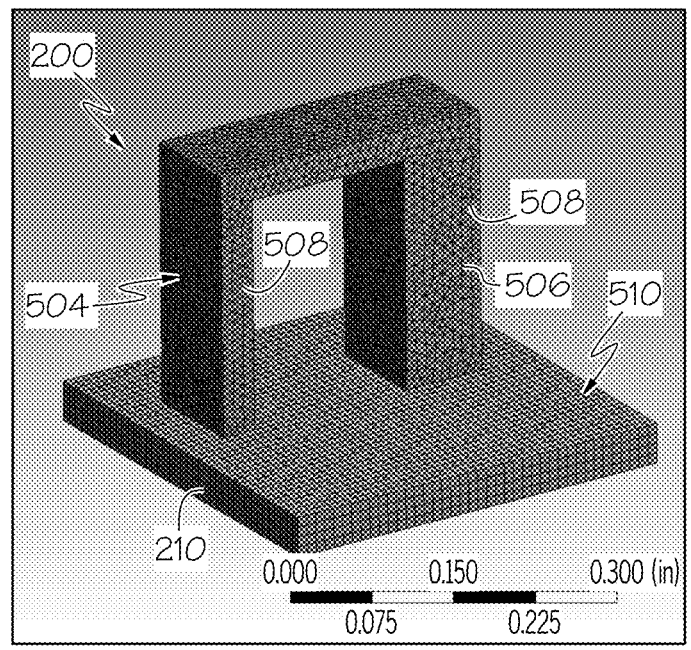
FIG. 5B schematically depicts a green body part mesh, according to one or more embodiments described herein.

FIG. 5B depicts the mesh 504 described with respect to FIG. 5A applied to the green body part 200 described herein with respect to FIGS. 2A and 2B. In the depicted embodiment, the mesh 504 is applied as a $2^{nd}$ order tetrahedral mesh, with the nodes 508 being placed at each corner of each element as well as midpoints of the boundary segments connecting the corners. The behaviors of the $2^{nd}$ order mesh may be modeled using second order polynomial equations to provide an accurate representation of the distortion of the green body part 200 during sintering. It should be appreciated that meshes having any order or shape may be used in the sintering analysis in accordance with the present disclosure. The sintering support 210 is discretized with a second mesh 510 (e.g., a second order tetrahedral mesh). In embodiments, the sintering support is constructed of a ceramic or other material not greatly distorted due to sintering, and is not discretized in the performance of the method 400 (FIG. 4).

Figure 5C:
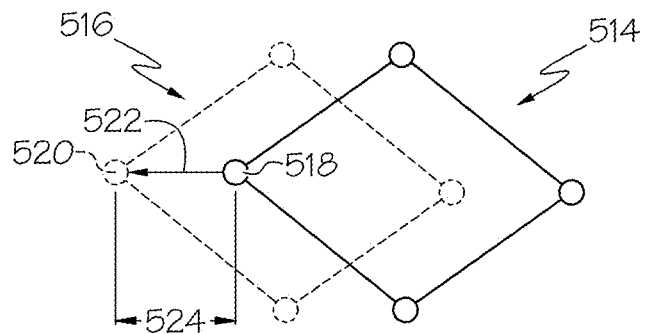
FIG. 5C schematically depicts a displacement of a node of a post-sintering mesh relative to a model mesh of a workpiece, according to one or more embodiments described herein.

FIG. 5C depicts the computation of a nodal displacement vector 522 during performance of the method 400. An element 514 of a model mesh and an element 516 of a post-sintering mesh are depicted. While the elements 514 and 516 are depicted as first order elements with nodes only at the corner of each element, such a mesh is depicted for explanatory purposes only and it should be understood that different mesh configurations are contemplated and within the scope of the present disclosure. In FIG. 5C, the model mesh nodes of the model mesh and the post-sintering mesh nodes of the post sintering mesh have already been co-registered in accordance with the method described herein with respect to FIG. 6. The nodal displacement vector 522 is computed between a node 518 associated with the element 514 and a corresponding node 520 associated with the element 516. The nodal displacement vector 522 depicts a magnitude 524 of the displacement between the nodes 518 and 520 as well as a direction of the displacement. As described herein, in performance of the method 400, the distortion analysis system 300 may compare the magnitude 524 to a threshold to determine if a building tolerance has been met.

Figure 6:
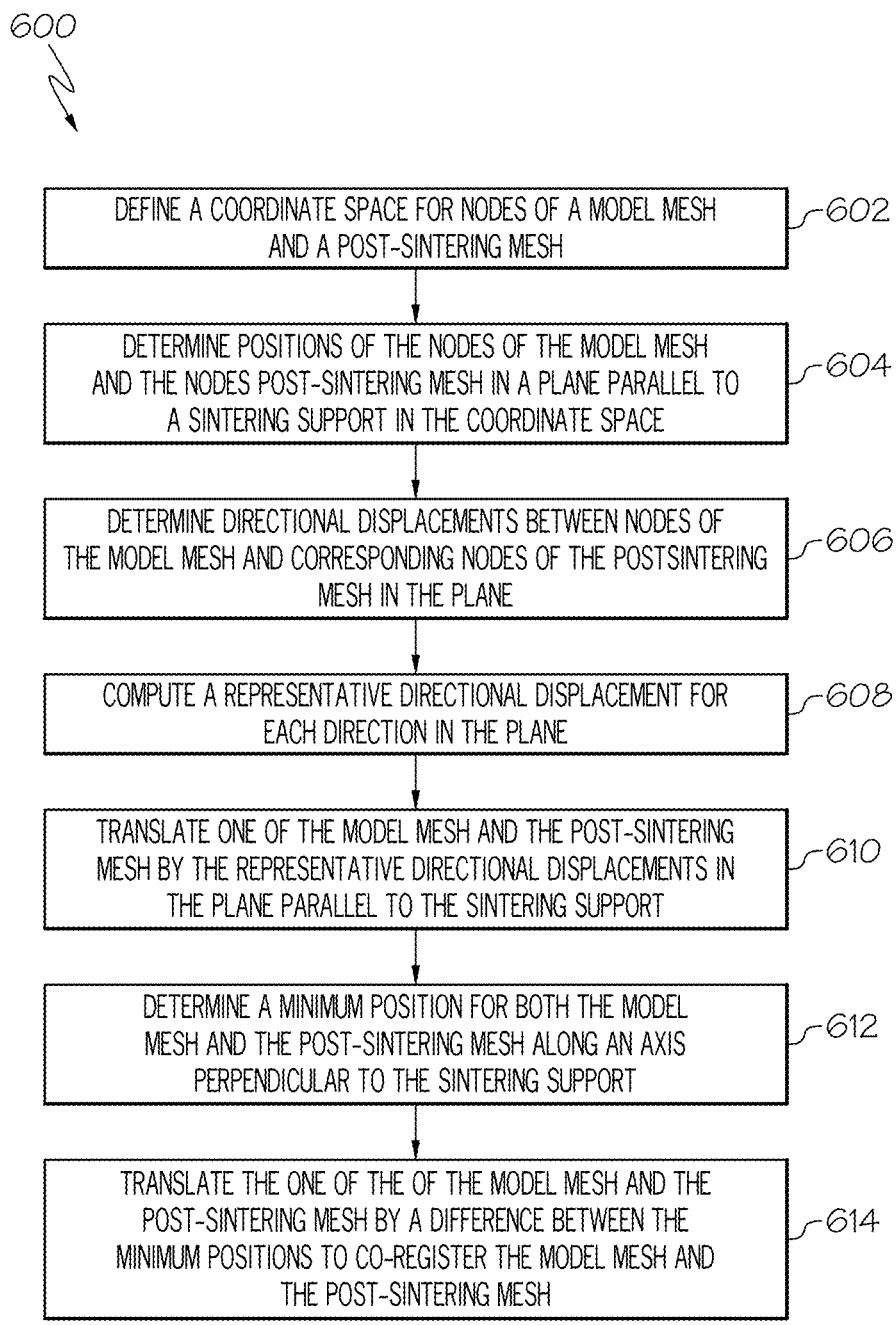
FIG. 6 depicts a flow diagram of a method of overlaying a post-sintering mesh with a model mesh in order to compute nodal displacement of the post-sintering mesh relative to the model mesh, according to one or more embodiments described herein.

Referring now to FIG. 6, a flow diagram of a method 600 of co-registering a model mesh and a post-sintering mesh (or any two corresponding meshes) to characterize the distortion of the post-sintering mesh and the model mesh is depicted. For example, the method 600 may be performed by the distortion analysis system 300 during block 412 of the method 400 described herein to facilitate the computation of nodal displacement vectors between the post sintering mesh and a model mesh such that the predicted displacement is an accurate representation of a total amount of distortion of the green body part during sintering. To accurately compensate a green body part for sintering-induced distortion, the amount of nodal displacement should be measured against a properly positioned baseline. The method 600 facilitates the positioning of the post-sintering mesh relative to the model mesh such that the model mesh serves as an accurate baseline for distortion prediction.

At block 602, the distortion analysis system 300 defines a coordinate space for nodes of the modeling mesh and the post-sintering mesh. In embodiments, the coordinate space may be selected based on the desired geometry for the workpiece. For example, when the workpiece has a substantially linear geometry (e.g., defined by linear segments joining at angles relative to one another), a Cartesian coordinate system including an x-direction component, a y-direction component, and a z-direction component may be used. For workpieces having a substantially circular geometry (e.g., cylindrically-shaped members), a cylindrical coordinate system may be used. It should be appreciated that while certain coordinate systems may be preferable for certain workpiece geometries, that any coordinate system may be used with any workpiece geometry consistent with the present disclosure.

At block 604, the distortion analysis system 300 determines positions of the model mesh nodes and the post-sintering nodes in a plane parallel to a sintering support upon which the green body part is disposed during sintering. For example, as described with respect to FIGS. 2A and 2B, the green body part 200 is supported on a sintering support 210 during sintering. Given this, the sintering support may confine movement of components of the green body part in contact with the sintering support in directions perpendicular to the sintering support. The sintering support 210 described with respect to FIGS. 2A and 2B, for example, is planar and extends in the X-Y plane and restricts motion of the portions of the green body part 200 in contact therewith in the Z-direction. Thus, any sintering supports in contact with the green body part may provide a point of reference of positional commonality between the meshes.

As depicted in FIG. 5B, in embodiments, the sintering support geometry may also be discretized and defined in conjunction with the green body part mesh. The sintering support may be constructed of material that does not shrink from the sintering. Thus, in an example, the positioning of the post-sintering nodes may be determined as (x, y) coordinates, with the x and y values being measured relative to a reference point on the sintering support. In embodiments, an arbitrary reference point (e.g., not associated with the sintering support) is selected. The model mesh node may then be brought into the coordinate space, and the positioning of the model mesh nodes may also computed as (x, y) coordinates relative to the same reference as that used to compute the positioning of the post-sintering mesh nodes.

At block 606, the distortion analysis system 300 determines directional displacements between model mesh nodes and corresponding ones of the post-sintering mesh nodes in the plane parallel to the sintering support. For example, if a particular post-sintering mesh node is positioned at a first location $(x_1, y_1)$ and a corresponding model mesh node is positioned at a second location $(x_2, y_2)$, a first directional displacement may be computed as $|x_1-x_2|$ and a second directional displacement may be computed as $|y_1-y_2|$. Such a procedure may be repeated for each pair of post-sintering mesh nodes and corresponding model mesh nodes to generate a plurality of directional displacements for each node.

At block 608, the distortion analysis system 300 computes a representative directional displacement in each direction in the plane parallel to the sintering support. The representative directional displacements may statistically represent a plurality of the directional displacements computed at block 606. In embodiments, the distortion analysis system 300 statistically analyzes the plurality of directional displacements computed at block 606 to compute the representative directional displacements. In embodiments, the distortion analysis system 300 averages all the displacements in each direction to determine the representative directional displacements. In an example, all of the displacements in the x-direction may be averaged to compute a representative x-direction displacement and all of the displacements in the y-direction may be averaged to compute a representative y-direction displacement. Other statistical metrics, such as mean or mode may also be used. In embodiments, outliers of the directional displacements (e.g., greater than two standard deviations away from an average) are excluded from the computation of the representative directional displacements.

At block 610, the distortion analysis system 300 translates one of the model mesh and the post sintering mesh by the representative directional displacements in the plane parallel to the sintering support. In an example, if x and y-direction displacements are computed as average displacements in the x-direction and the y-direction between the model mesh nodes and corresponding post-sintering nodes, respectively, the post-sintering mesh (e.g., all of the plurality of post-sintering mesh nodes) may be translated by the average x-direction displacement in the x-direction and the average y-direction displacement in the y-direction. By incorporating a plurality of the directional displacements into the computation of the representative directional displacements at block 608, the method 600 beneficially translates one of the meshes by an amount that incorporates displacement amounts of every node and thereby prevents the disfigurement of certain portions of the post-sintering mesh from dictating the translation. For example, if an arbitrary reference point on both the meshes was selected and the displacement between a model mesh node and a post-sintering mesh node at that point were used to displace both of the nodes, computation of the nodal displacement vectors in the method 400 of FIG. 4 would be inaccurate if the distortion in the post-sintering mesh node at that point was not an accurate representation of the overall distortion of the green body part during sintering. Using a statistical representation of each of the directional displacements between corresponding nodes prevents such inaccuracies.

At block 612, the distortion analysis system 300 determines a minimum position for the model mesh and the post-sintering mesh along an axis perpendicular to the sintering support. In the example described herein with respect to FIGS. 2A and 2B, the sintering support 210 prevents the lowermost parts of the green body part 200 from moving in the negative Z-direction. Thus, the lowermost parts of the green body part 200 represents a surface of the sintering support 210. Accordingly, the model mesh node having a minimum Z-position and the post-sintering mesh node having a minimum Z-position are identified. At block 614, the distortion analysis system 300 translates one of the model mesh and the post-sintering mesh by a difference between the minimum positions determined at block 612 such that the lowermost points are co-aligned where a sintering support where be placed. Movement of one of the meshes relative to the other first in the plane parallel to the sintering support and then in the plane perpendicular to the sintering support results in a co-registering of the post-sintering mesh and the model mesh.

The performance of the method 600 allows for accurate quantification of the actual geometric distortion of the post-sintering mesh relative to a desired geometry. After performance of the method 600, nodal displacement vectors, such as the nodal displacement vector 522 may be determined and compared to a building tolerance to determine whether compensation of a green body part geometry is needed. Additionally, performance of the method 600 may also facilitate generation of views allowing users to visualize the distortion caused by sintering. For example, the view depicted in FIG. 2B may be facilitated by performance of the method 600 to provide an accurate visual comparison between the post-sintering part 202 and the undistorted workpiece model 204.

Figure 7A:
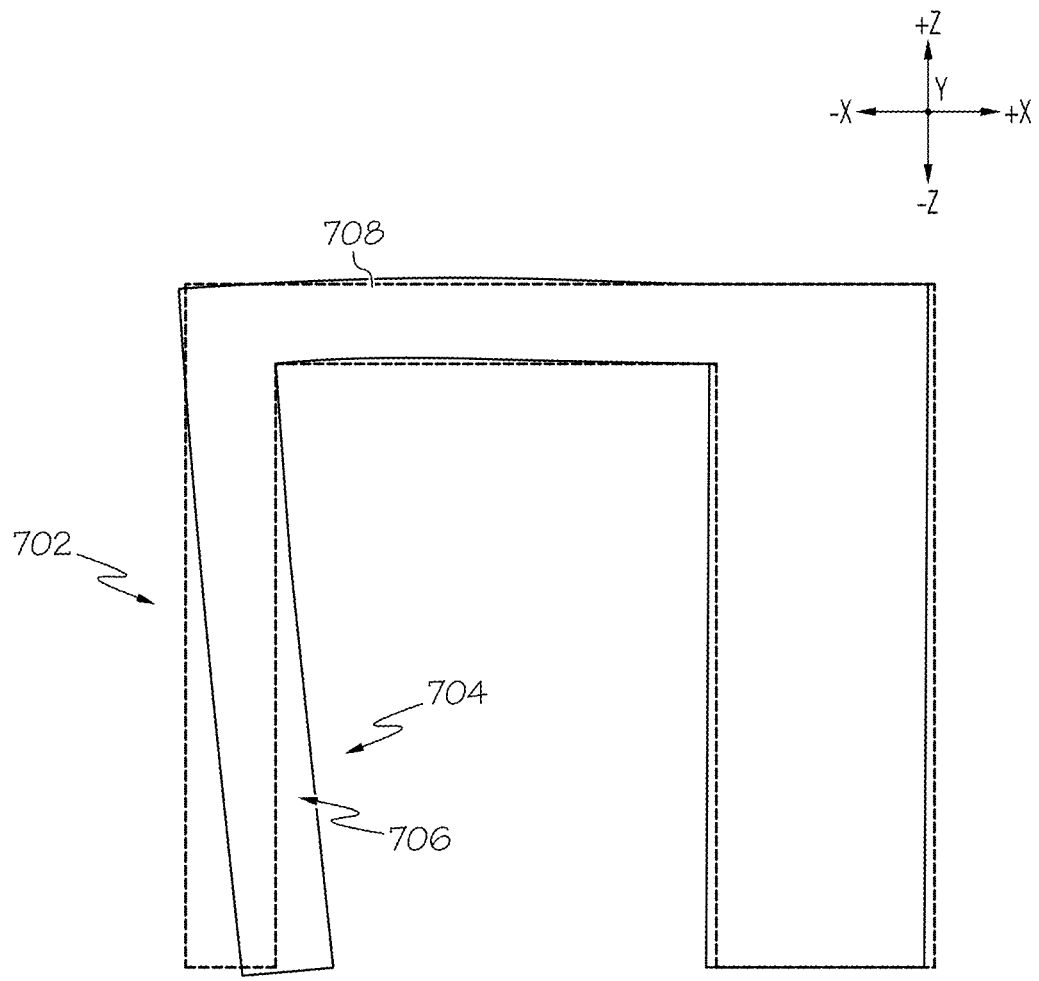
FIG. 7A schematically depicts a distortion-compensated geometry for a green body part overlaid onto a nominal-distortion free green body part geometry, according to one or more embodiments described herein.

FIG. 7A schematically depicts a distortion-compensated green body part geometry 704 for a workpiece overlaid onto a nominal-distortion free green body part geometry 702. In embodiments, the distortion free green body part geometry 702 may represent a scaled-up version CAD model or the like input to the distortion analysis system 300 or additive manufacturing apparatus 26. That is, the distortion free green body part geometry 702 may have a shape corresponding to a desired model for a post-sintering part. The distortion free green body part geometry 702 is similar to the green body part 200 described herein with respect to FIGS. 2A and 2B. The distortion-compensated green body part geometry 704 may be output by the distortion analysis system 300 as a result of the performance of the method 400 described herein with respect to FIG. 4. As depicted, distortion-compensated green body part geometry 704 significantly deviates from the distortion free green body part geometry 702 in shape. For example, a first portion 706 of the distortion-compensated green body part geometry 704 extends in a different direction than a first corresponding portion of the distortion free green body part geometry 702. Additionally, a second portion 708 of the distortion-compensated green body part geometry 704 is curved, while a second corresponding portion of the distortion free green body part geometry 702 is relatively straight.

Figure 7B:
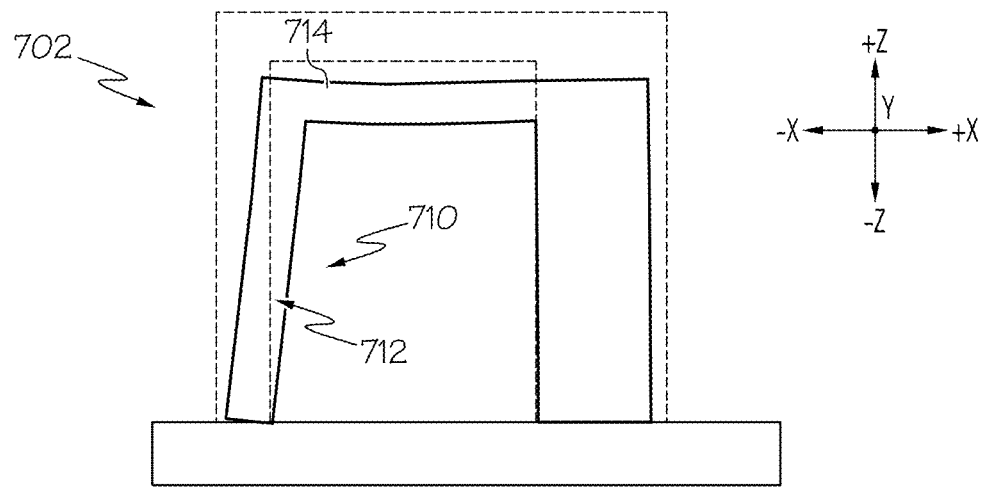
FIG. 7B schematically depicts the distortion free green body part geometry of FIG. 7A overlaid onto a first post-sintering geometry, according to one or more embodiments described herein.
Figure 7C:
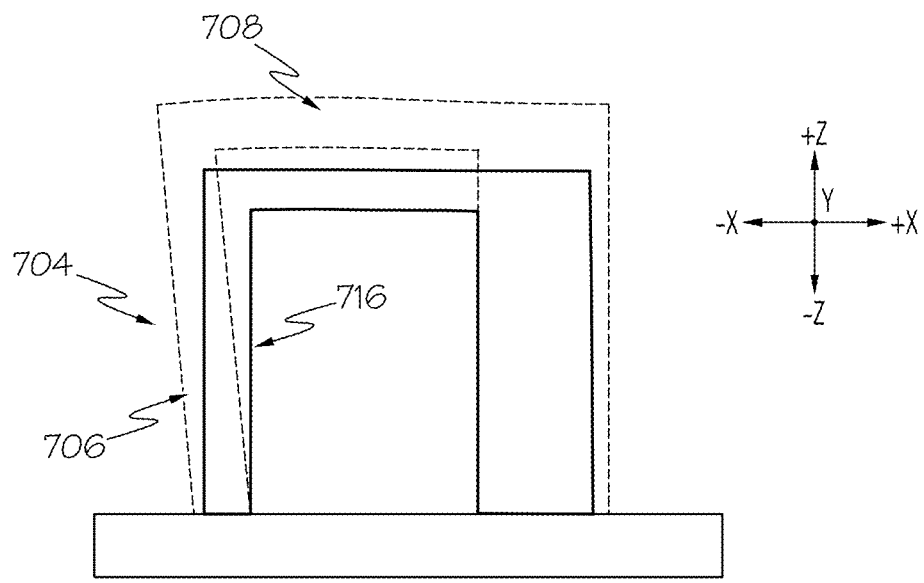
FIG. 7C schematically depicts the distortion-compensated geometry for the green body part of FIG. 7A overlaid onto a second post-sintering geometry; according to one or more embodiments described herein.

FIGS. 7B and 7C illustrate the reasons for the differences between the distortion free green body part geometry 702 and the distortion-compensated green body part geometry 704 depicted in FIG. 7A. FIG. 7B schematically depicts the distortion free green body part geometry 702 overlaid onto a first post-sintering geometry 710. In embodiments, the first post-sintering geometry 710 is a result of performing the sintering analysis described herein with respect to block 410 of the method 400 on the distortion free green body part geometry 702 (e.g., as an initial iteration of the method 400). As depicted, the first post-sintering geometry 710 includes a first distorted portion 712 that extends in a different direction relative to a first corresponding portion of the distortion free green body part geometry 702 and a second distortion portion 714 that is bent relative to a second corresponding portion of the distortion free green body part geometry 702.

FIG. 7C schematically depicts the distortion-compensated green body part geometry 704 overlaid onto a second post-sintering geometry 716. In embodiments, the second post-sintering geometry 716 is a result of performing the sintering analysis described herein with respect to block 410 of the method 400 on the distortion-compensated green body part geometry 704 (e.g., as an additional iteration of the method 400). As shown, the second post-sintering geometry 716 has a shape that corresponds to a scaled-down version of the distortion free green body part geometry 702. As is apparent from comparing the distortion-compensated green body part geometry 704 to the first post-sintering geometry 710 of FIG. 7B, the first portion 706 of the distortion-compensated green body part geometry 704 is bent to oppose the manner with which the first distorted portion 712 of the first post-sintering geometry 710 extends after sintering. Moreover, the second portion 708 of the distortion-compensated green body part geometry 704 is bent in an opposite direction of the second distorted portion 714 of the first post-sintering geometry 710 to oppose the curvature thereof. As a result, the second post-sintering geometry 716 has a geometry that largely corresponds in shape to the undistorted workpiece model 204 described herein with respect to FIG. 2B. As such, the systems and methods described herein facilitate the formation of workpieces having a desired shape post-sintering, despite sintering-induced distortion.

In view of the foregoing description, it should be understood that generating a distortion-compensated geometry for a green body part produced via a binder jet additive manufacturing apparatus beneficially facilitates the production of workpieces having desired geometries. By adjusting a green body part mesh in a manner to counteract a predicted displacement between green body part mesh nodes of the green body part mesh and a model mesh having a desired geometry to generate an updated green body part mesh, and then subjecting the green body part to a sintering analysis to determine if the updated green body part mesh results in a post-sintering geometry that meets a building tolerance for a workpiece, the systems and methods described herein ensure that building tolerances are met. Such a process facilitates the utilization of binder jet additive manufacturing to produce workpieces having greater complexities than previously possible, and also reduce the need for workpiece redesign, beneficially providing overall process efficiencies.

Further aspects of the invention are provided by the subject matter in the following clauses:

1. A method of generating a distortion-compensated geometry for a workpiece, the method comprising: receiving a three-dimensional model for the workpiece; scaling the three-dimensional model by a green scaling factor to generate a green body part geometry; discretizing the green body part geometry into a green body part mesh, the green body part mesh comprising a plurality of green body part mesh nodes; performing a first sintering analysis on the green body part mesh to generate a post-sintering mesh based on the green body part mesh, the post-sintering mesh including a plurality of post-sintering mesh nodes; co-registering the post-sintering mesh and a model mesh having a geometry corresponding to the three-dimensional model, the model mesh including a plurality of model mesh nodes, each of the plurality of model mesh nodes corresponding to one of the post-sintering mesh nodes; for each of the plurality of post-sintering mesh nodes, determine a displacement between a post-sintering mesh node and a corresponding model mesh node; determining that at least one of the displacements is greater than or equal to a threshold; in response to the determination, moving a green body part mesh node in the green body part mesh in a direction opposite to a direction of the displacement of the post sintering mesh node that corresponds to the green body part mesh node to generate the distortion-predicting geometry; and outputting the distortion-compensated geometry to an additive manufacturing apparatus for printing the workpiece.

2. The method of any preceding aspect, further comprising generating the model mesh by down-scaling the green body part mesh using the green scaling factor.

3. The method of any preceding aspect, further comprising receiving the threshold as an input from a user, the threshold comprising a build tolerance for the workpiece.

4. The method of any preceding aspect, wherein the determining that at least one of the displacements is greater than or equal to a threshold comprises comparing each displacement between each post-sintering node and that post-sintering node's corresponding model mesh node to the threshold.

5. The method of any preceding aspect, wherein the determining that at least one of the displacements is greater than or equal to a threshold further comprises determining that each displacement between each post-sintering node and that post-sintering node's corresponding model mesh node is greater than a nodal threshold for that particular post sintering node.

6. The method of any preceding aspect, wherein the nodal thresholds differ from one another based on position within the workpiece.

7. The method of any preceding aspect, wherein the determining that at least one of the displacements is greater than or equal to a threshold comprises determining that a total of the displacements exceeds the threshold.

8. The method of any preceding aspect, wherein the moving the green body part mesh node in the green body part mesh in the direction opposite to the direction of the displacement of the post sintering mesh node that corresponds to the green body part mesh node comprises: inverting the displacement of the post-sintering mesh node; multiplying the displacement of the post-sintering mesh node by a nodal compensation factor to compute a compensation displacement; and adding the compensation displacement to a position of the green body part mesh node to move the green body part mesh node and generate an updated green body part mesh.

9. The method of any preceding aspect, wherein the nodal compensation factor is particular to that green body part mesh node based on the location of that green body part mesh node within the green body part mesh.

10. The method of any preceding aspect, further comprising: performing an additional sintering analysis on the updated green body part mesh to generate an additional post-sintering mesh, the additional post-sintering mesh including a plurality of additional post-sintering mesh nodes; co-registering the additional post-sintering mesh and the model mesh; for each of the plurality of additional post-sintering mesh nodes, determine a displacement between the additional post-sintering mesh node and a corresponding model mesh node; determining that the displacements satisfy the threshold; and in response to the determination, outputting the updated green body part mesh as the distortion-compensated geometry.

11. The method of any preceding aspect, wherein the co-registering the post-sintering mesh and the model mesh comprises: determining displacements between each of the plurality of post-sintering nodes and the plurality of model mesh nodes in a plane extending parallel to a sintering support upon which at least a portion of the green body part rests during sintering; computing representative directional displacements of each post sintering mesh node relative to a corresponding model mesh node in a plurality of directions within the plane; moving an entirety of one of the plurality of post-sintering nodes and the plurality of model mesh nodes relative to the other of the plurality of post-sintering nodes and the plurality of model mesh nodes by each of the representative directional displacements within the plane; determining a difference between minimum positions of the plurality of post-sintering nodes and the plurality of model mesh nodes along an axis perpendicular to the sintering support; and moving an entirety of one of the plurality of post-sintering nodes and the model mesh nodes relative to the other of the plurality of post-sintering nodes and the plurality of model mesh nodes by the difference between the minimum positions.

12. A method of generating a distortion-compensated geometry for a workpiece includes generating a green body part mesh for the workpiece, the green body part mesh comprising a plurality of green body part mesh nodes; performing a first sintering analysis on the green body part mesh to generate a post-sintering mesh based on the green body part mesh, the post-sintering mesh including a plurality of post-sintering mesh nodes, the first sintering analysis comprising a plurality of loading conditions, the loading conditions comprising at least one of a gravitational load and a frictional load; co-registering the post-sintering mesh and a model mesh having a geometry corresponding to a desired geometry for the workpiece, the model mesh including a plurality of model mesh nodes, each of the plurality of model mesh nodes corresponding to one of the post-sintering mesh nodes; computing a plurality of displacements of the plurality of post-sintering mesh nodes relative to the plurality of model mesh nodes, each of the displacements representing a distance between a post-sintering mesh node and a corresponding one of the model mesh nodes; determining that the plurality of displacements does not meet a predetermined tolerance for the workpiece; in response to the determination, moving a green body part mesh node in the green body part mesh in a direction opposite to a direction of the displacement of the post sintering mesh node that corresponds to the green body part mesh node to generate the distortion-compensated geometry; and outputting the distortion-compensated geometry to an additive manufacturing apparatus for printing the workpiece.

13. The method of any preceding aspect, wherein the moving a green body part mesh node in the green body part mesh in the direction opposite to the direction of the displacement of the post sintering mesh node that corresponds to the green body part mesh node comprises: inverting the displacement of the post-sintering mesh node; multiplying the displacement of the post-sintering mesh node by a nodal compensation factor to compute a compensation displacement; and adding the compensation displacement to a position of the green body part mesh node to move the green body part mesh node and generate an updated green body part mesh.

14. The method of any preceding aspect, further comprising: performing an additional sintering analysis on the updated green body part mesh to generate an additional post-sintering mesh, the additional post-sintering mesh including a plurality of additional post-sintering mesh nodes; co-registering the additional post-sintering mesh and the model mesh; computing a plurality of displacements of the plurality of additional post-sintering mesh nodes relative to the plurality of model mesh nodes, each of the additional displacements representing a distance between an additional post-sintering mesh node and a corresponding one of the model mesh nodes; determining that the plurality of displacements meets the predetermined tolerance for the workpiece; and in response to the determination, outputting the updated green body part mesh as the distortion-compensated geometry.

15. The method of claim any preceding aspect, further comprising: receiving a three-dimensional model of the workpiece; and expanding the three-dimensional model by a green scaling factor to generate a green part geometry based on the three-dimensional model, wherein the green body part mesh is generated from the green body part geometry.

16. The method of any preceding aspect, wherein the co-registering the post-sintering mesh and the model mesh comprises: determining displacements between each of the plurality of post-sintering nodes and the plurality of model mesh nodes in a plane extending parallel to a sintering support upon which at least a portion of the green body part rests during sintering; computing representative directional displacements of each post sintering mesh node relative to a corresponding model mesh node in a plurality of directions within the plane; moving an entirety of one of the plurality of post-sintering nodes and the plurality of model mesh nodes relative to the other of the plurality of post-sintering nodes and the plurality of model mesh nodes by each of the representative directional displacements within the plane; determining a difference between minimum positions of the plurality of post-sintering nodes and the plurality of model mesh nodes along an axis perpendicular to the sintering support; and moving an entirety of one of the plurality of post-sintering nodes and the model mesh nodes relative to the other of the plurality of post-sintering nodes and the plurality of model mesh nodes by the difference between the minimum positions.

17. A system for predicting a post-sintering geometry of a green body part after sintering includes one or more processors; and one or more non-transitory memory modules communicatively coupled to the one or more processors and storing machine-readable instructions that, when executed, cause the one or more processors to: receive a three-dimensional model for a workpiece; scale the three-dimensional model by a green scaling factor to generate a green body part geometry; discretize the green body part geometry into a green body part mesh, the green body part mesh comprising a plurality of green body part mesh nodes; perform a first sintering analysis on the green body part mesh to generate a post-sintering mesh based on the green body part mesh, the post-sintering mesh including a plurality of post-sintering mesh nodes; co-register the post-sintering mesh and a model mesh having a geometry corresponding to the three-dimensional model, the model mesh including a plurality of model mesh nodes, each of the plurality of model mesh nodes corresponding to one of the post-sintering mesh nodes; for each of the plurality of post-sintering mesh nodes, determine a displacement between the post-sintering mesh node and a corresponding model mesh node; determine that at least one of the displacements is greater than or equal to a threshold; in response to the determination, move a green body part mesh node in the green body part mesh in a direction opposite to a direction of the displacement of the post sintering mesh node that corresponds to the green body part mesh node to generate a distortion-compensated green body part geometry; and output the distortion-compensated geometry to an additive manufacturing apparatus for printing the workpiece.

18. The system of any preceding aspect, wherein the determining that at least one of the displacements is greater than or equal to the threshold comprises comparing each displacement between each post-sintering node and that post-sintering node's corresponding model mesh node to the threshold.

19. The system of any preceding aspect, wherein the moving a green body part mesh node in the green body part mesh in the direction opposite to the direction of the displacement of the post sintering mesh node that corresponds to the green body part mesh node comprises: inverting the displacement of the post-sintering mesh node; multiplying the displacement of the post-sintering mesh node by a nodal compensation factor to compute a compensation displacement; and adding the compensation displacement to a position of the green body part mesh node to move the green body part mesh node and generate an updated green body part mesh.

20. The system of any preceding aspect, wherein the instructions further cause the processor to: perform an additional sintering analysis on the updated green body part mesh to generate an additional post-sintering mesh, the additional post-sintering mesh including a plurality of additional post-sintering mesh nodes; co-register the additional post-sintering mesh and the model mesh; for each of the plurality of additional post-sintering mesh nodes, determine a displacement between an additional post-sintering mesh node and a corresponding model mesh node; determine that the displacements satisfy the threshold; and in response to the determination, outputting the updated green body part mesh as the distortion-compensated geometry.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A method of generating a distortion-compensated geometry for a workpiece, the method comprising:
receiving a three-dimensional model for the workpiece;
scaling the three-dimensional model by a green scaling factor to generate a green body part geometry;
discretizing the green body part geometry into a green body part mesh, the green body part mesh comprising a plurality of green body part mesh nodes;
performing a first sintering analysis on the green body part mesh to generate a post-sintering mesh based on the green body part mesh, the post-sintering mesh including a plurality of post-sintering mesh nodes, wherein the first sintering analysis simulates a process which includes heating a green body part to one or more elevated temperatures;
co-registering the post-sintering mesh and a model mesh having a geometry corresponding to the three-dimensional model, the model mesh including a plurality of model mesh nodes, each of the plurality of model mesh nodes corresponding to one of the post-sintering mesh nodes;
for each of the plurality of post-sintering mesh nodes, determine a displacement between a post-sintering mesh node and a corresponding model mesh node;

determining that at least one of the displacements is greater than or equal to a threshold;

in response to the determination, moving a green body part mesh node in the green body part mesh in a direction opposite to a direction of the displacement of the post sintering mesh node that corresponds to the green body part mesh node to generate the distortion-compensated geometry; and outputting the distortion-compensated geometry to an additive manufacturing apparatus for printing the workpiece.

2. The method of claim 1, further comprising generating the model mesh by down-scaling the green body part mesh using the green scaling factor.

3. The method of claim 1, further comprising receiving the threshold as an input from a user, the threshold comprising a build tolerance for the workpiece.

4. The method of claim 1, wherein the determining that at least one of the displacements is greater than or equal to a threshold comprises comparing each displacement between each post-sintering node and that post-sintering node's corresponding model mesh node to the threshold.

5. The method of claim 4, wherein the determining that at least one of the displacements is greater than or equal to a threshold further comprises determining that each displacement between each post-sintering node and that post-sintering node's corresponding model mesh node is greater than a nodal threshold for that particular post sintering node.

6. The method of claim 5, wherein the nodal thresholds differ from one another based on position within the workpiece.

7. The method of claim 1, wherein the determining that at least one of the displacements is greater than or equal to a threshold comprises determining that a total of the displacements exceeds the threshold.

8. The method of claim 1, wherein the moving the green body part mesh node in the green body part mesh in the direction opposite to the direction of the displacement of the post sintering mesh node that corresponds to the green body part mesh node comprises:

inverting the displacement of the post-sintering mesh node;

multiplying the displacement of the post-sintering mesh node by a nodal compensation factor to compute a compensation displacement; and adding the compensation displacement to a position of the green body part mesh node to move the green body part mesh node and generate an updated green body part mesh.

9. The method of claim 8, wherein the nodal compensation factor is particular to that green body part mesh node based on the location of that green body part mesh node within the green body part mesh.

10. The method of claim 8, further comprising:

performing an additional sintering analysis on the updated green body part mesh to generate an additional post-sintering mesh, the additional post-sintering mesh including a plurality of additional post-sintering mesh nodes;

co-registering the additional post-sintering mesh and the model mesh;

for each of the plurality of additional post-sintering mesh nodes, determine a displacement between the additional post-sintering mesh node and a corresponding model mesh node;

determining that the displacements satisfy the threshold; and in response to the determination, outputting the updated green body part mesh as the distortion-compensated geometry.

11. The method of claim 1, wherein the co-registering the post-sintering mesh and the model mesh comprises:

determining displacements between each of the plurality of post-sintering nodes and the plurality of model mesh nodes in a plane extending parallel to a sintering support upon which at least a portion of the green body part rests during sintering;

computing representative directional displacements of each post sintering mesh node relative to a corresponding model mesh node in a plurality of directions within the plane;

moving an entirety of one of the plurality of post-sintering nodes and the plurality of model mesh nodes relative to the other of the plurality of post-sintering nodes and the plurality of model mesh nodes by each of the representative directional displacements within the plane;

determining a difference between minimum positions of the plurality of post-sintering nodes and the plurality of model mesh nodes along an axis perpendicular to the sintering support; and moving an entirety of one of the plurality of post-sintering nodes and the model mesh nodes relative to the other of the plurality of post-sintering nodes and the plurality of model mesh nodes by the difference between the minimum positions.

12. A method of generating a distortion-compensated geometry for a workpiece, the method comprising:

generating a green body part mesh for the workpiece, the green body part mesh comprising a plurality of green body part mesh nodes;

performing a first sintering analysis on the green body part mesh to generate a post-sintering mesh based on the green body part mesh, the post-sintering mesh including a plurality of post-sintering mesh nodes, the first sintering analysis comprising a plurality of loading conditions, the loading conditions comprising at least one of a gravitational load and a frictional load, wherein the first sintering analysis simulates a process which includes heating a green body part to one or more elevated temperatures;

co-registering the post-sintering mesh and a model mesh having a geometry corresponding to a desired geometry for the workpiece, the model mesh including a plurality of model mesh nodes, each of the plurality of model mesh nodes corresponding to one of the post-sintering mesh nodes;

computing a plurality of displacements of the plurality of post-sintering mesh nodes relative to the plurality of model mesh nodes, each of the displacements representing a distance between a post-sintering mesh node and a corresponding one of the model mesh nodes;

determining that the plurality of displacements does not meet a predetermined tolerance for the workpiece;

in response to the determination, moving a green body part mesh node in the green body part mesh in a direction opposite to a direction of the displacement of the post sintering mesh node that corresponds to the green body part mesh node to generate the distortion-compensated geometry; and outputting the distortion-compensated geometry to an additive manufacturing apparatus for printing the workpiece.

13. The method of claim 12, wherein the moving a green body part mesh node in the green body part mesh in the direction opposite to the direction of the displacement of the post sintering mesh node that corresponds to the green body part mesh node comprises:
    inverting the displacement of the post-sintering mesh node;
    multiplying the displacement of the post-sintering mesh node by a nodal compensation factor to compute a compensation displacement; and
    adding the compensation displacement to a position of the green body part mesh node to move the green body part mesh node and generate an updated green body part mesh.

14. The method of claim 13, further comprising:
    performing an additional sintering analysis on the updated green body part mesh to generate an additional post-sintering mesh, the additional post-sintering mesh including a plurality of additional post-sintering mesh nodes;
    co-registering the additional post-sintering mesh and the model mesh;
    computing a plurality of displacements of the plurality of additional post-sintering mesh nodes relative to the plurality of model mesh nodes, each of the additional displacements representing a distance between an additional post-sintering mesh node and a corresponding one of the model mesh nodes;
    determining that the plurality of displacements meets the predetermined tolerance for the workpiece; and
    in response to the determination, outputting the updated green body part mesh as the distortion-compensated geometry.

15. The method of claim 12, further comprising:
    receiving a three-dimensional model of the workpiece; and
    expanding the three-dimensional model by a green scaling factor to generate a green part geometry based on the three-dimensional model, wherein the green body part mesh is generated from the green body part geometry.

16. The method of claim 12, wherein the co-registering the post-sintering mesh and the model mesh comprises:
    determining displacements between each of the plurality of post-sintering nodes and the plurality of model mesh nodes in a plane extending parallel to a sintering support upon which at least a portion of the green body part rests during sintering;
    computing representative directional displacements of each post sintering mesh node relative to a corresponding model mesh node in a plurality of directions within the plane;
    moving an entirety of one of the plurality of post-sintering nodes and the plurality of model mesh nodes relative to the other of the plurality of post-sintering nodes and the plurality of model mesh nodes by each of the representative directional displacements within the plane;
    determining a difference between minimum positions of the plurality of post-sintering nodes and the plurality of model mesh nodes along an axis perpendicular to the sintering support; and
    moving an entirety of one of the plurality of post-sintering nodes and the model mesh nodes relative to the other of the plurality of post-sintering nodes and the plurality of model mesh nodes by the difference between the minimum positions.

17. A system for predicting a post-sintering geometry of a green body part after sintering, the system comprising:
    one or more processors; and
    one or more non-transitory memory modules communicatively coupled to the one or more processors and storing machine-readable instructions that, when executed, cause the one or more processors to:
    receive a three-dimensional model for a workpiece;
    scale the three-dimensional model by a green scaling factor to generate a green body part geometry;
    discretize the green body part geometry into a green body part mesh, the green body part mesh comprising a plurality of green body part mesh nodes;
    perform a first sintering analysis on the green body part mesh to generate a post-sintering mesh based on the green body part mesh, the post-sintering mesh including a plurality of post-sintering mesh nodes, wherein the first sintering analysis simulates a process which includes heating the green body part to one or more elevated temperatures;
    co-register the post-sintering mesh and a model mesh having a geometry corresponding to the three-dimensional model, the model mesh including a plurality of model mesh nodes, each of the plurality of model mesh nodes corresponding to one of the post-sintering mesh nodes;
    for each of the plurality of post-sintering mesh nodes, determine a displacement between the post-sintering mesh node and a corresponding model mesh node;
    determine that at least one of the displacements is greater than or equal to a threshold;
    in response to the determination, move a green body part mesh node in the green body part mesh in a direction opposite to a direction of the displacement of the post sintering mesh node that corresponds to the green body part mesh node to generate a distortion-compensated green body part geometry; and
    output the distortion-compensated geometry to an additive manufacturing apparatus for printing the workpiece.

18. The system of claim 17, wherein the determining that at least one of the displacements is greater than or equal to the threshold comprises comparing each displacement between each post-sintering node and that post-sintering node's corresponding model mesh node to the threshold.

19. The system of claim 17, wherein the moving a green body part mesh node in the green body part mesh in the direction opposite to the direction of the displacement of the post sintering mesh node that corresponds to the green body part mesh node comprises:
    inverting the displacement of the post-sintering mesh node;
    multiplying the displacement of the post-sintering mesh node by a nodal compensation factor to compute a compensation displacement; and
    adding the compensation displacement to a position of the green body part mesh node to move the green body part mesh node and generate an updated green body part mesh.

20. The system of claim 19, wherein the instructions further cause the processor to:
    perform an additional sintering analysis on the updated green body part mesh to generate an additional post-sintering mesh, the additional post-sintering mesh including a plurality of additional post-sintering mesh nodes;
    co-register the additional post-sintering mesh and the model mesh;

for each of the plurality of additional post-sintering mesh nodes, determine a displacement between an additional post-sintering mesh node and a corresponding model mesh node;

determine that the displacements satisfy the threshold; and in response to the determination, outputting the updated green body part mesh as the distortion-compensated geometry.

* * * * *